(12) United States Patent
Guo et al.

(10) Patent No.: US 10,405,714 B2
(45) Date of Patent: Sep. 10, 2019

(54) BLOWER

(71) Applicant: CHERVON INTELLECTUAL PROPERTY LIMITED, Road Town (VG)

(72) Inventors: Jianpeng Guo, Nanjing (CN); Fangjie Nie, Nanjing (CN); Xiandian Shao, Nanjing (CN); Toshinari Yamaoka, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 537 days.

(21) Appl. No.: 14/813,829

(22) Filed: Jul. 30, 2015

(65) Prior Publication Data

US 2016/0029863 A1 Feb. 4, 2016

(30) Foreign Application Priority Data

Aug. 1, 2014 (CN) .......................... 2014 1 0378271
Aug. 1, 2014 (CN) ..................... 2014 2 0434767 U
Aug. 13, 2014 (CN) ..................... 2014 2 0457806 U

(51) Int. Cl.
*A47L 9/02* (2006.01)
*A47L 5/00* (2006.01)
*A47L 9/08* (2006.01)
*E01H 1/08* (2006.01)
*A47L 5/14* (2006.01)
*A01G 20/47* (2018.01)
*A47L 9/28* (2006.01)
*A47L 9/32* (2006.01)

(52) U.S. Cl.
CPC ................ *A47L 9/08* (2013.01); *A01G 20/47* (2018.02); *A47L 5/14* (2013.01); *E01H 1/08* (2013.01); *A47L 9/2842* (2013.01); *A47L 9/2857* (2013.01); *A47L 9/32* (2013.01)

(58) Field of Classification Search
CPC ............. A47L 5/14; A47L 9/08; F04D 29/544
USPC ..... 15/405, 415.1; 239/382, 558, 590.5, 552
See application file for complete search history.

(56) References Cited

U.S. PATENT DOCUMENTS

| 5,841,943 A | * | 11/1998 | Nosenchuck | .......... A45D 20/10 392/385 |
| 6,011,903 A | * | 1/2000 | Nosenchuck | .......... A45D 20/10 34/97 |
| 6,499,942 B1 | * | 12/2002 | Nonaka | ................. F04D 19/042 415/193 |
| 2015/0366424 A1 | * | 12/2015 | Naka | ........................ B05B 1/34 239/590.5 |

FOREIGN PATENT DOCUMENTS

| CN | 101666321 A | * | 3/2010 |
| CN | 203476823 U | | 3/2014 |
| JP | 2014098320 A | * | 5/2014 |
| JP | 2014098320 A | * | 5/2014 |

* cited by examiner

*Primary Examiner* — Bryan R Muller
(74) *Attorney, Agent, or Firm* — Greenberg Traurig, LLP

(57) ABSTRACT

A blowing machine has a main machine where the main machine includes a housing, a motor and a fan with the housing having a main machine air channel in which the motor and the fan are at least partially accommodated. An airflow guiding assembly is attachable to the housing and has an air duct for guiding the airflow and an airflow guiding member for guiding a part of the airflow in the air duct to flow in a direction deflecting from the first axis.

11 Claims, 13 Drawing Sheets ated in the main machine air channel, and the motor 12

BLOWER

RELATED APPLICATION INFORMATION

This application claims the benefit of CN 201410378271.0, filed on Aug. 1, 2014, CN 201420434767.0, filed on Aug. 1, 2014, and CN 201420457806.9, filed on Aug. 13, 2014, the disclosures of which are incorporated herein by reference in their entirety.

FIELD OF THE DISCLOSURE

The present disclosure relates to a blower.

BACKGROUND

With the increasing development of the blower, people have higher requirements for the operational comfort and blowing effect of the blower. As known blowers usually blow air in a straight airflow path, a great rearward pushing force will be generated due to the single airflow direction, which force can press upon the wrist of the user and make the user feel uncomfortable. Also, due to the single airflow direction, leaves trend to adhere to the ground and thus cannot be blown easily, thus the blowing effect is often unsatisfactory.

SUMMARY

The present disclosure provides a blower, mainly comprising: a main machine with a main machine air channel; and an airflow guiding assembly for guiding an airflow generated in the main machine air channel; the main machine comprising: a housing for at least forming a portion of the main machine air channel; a fan for generating the airflow in the main machine air channel; and a motor for driving the fan to rotate; the fan and the motor being accommodated in the housing; the airflow guiding assembly comprising: an air duct for guiding the airflow in the main machine air channel to flow in a direction of a first axis; and an airflow guiding member for guiding a part of the airflow in the air duct to flow in a direction deflecting from the first axis; wherein the air duct has two opposite ends, one of which is integrated with the housing of the main machine, and the airflow guiding member is arranged adjacent to the other end.

The airflow guiding member enables the air duct to form an air duct channel at least extending along the direction of the first axis, the air duct channel comprising a first airflow guiding section having an annular air-out area for generating a cyclone at a periphery thereof and a central air-out area for outputting a straight airflow at the center of the annular air-out area.

Further, the air duct channel may comprise a second airflow guiding section arranged between the fan and the first airflow guiding section and only having an upstream airflow guiding chamber, the airflow at the center of the upstream airflow guiding chamber being guided to the central air-out area and the airflow at the periphery being guided to the annular air-out area.

Further, the air duct for the main machine may be removable, and the main machine may be fitted with different air ducts by a quick removable structure.

In the above solution, the blower can output a composite airflow with the airflow guiding member. The airflow deflecting from the original airflow guiding direction can disperse the reaction force caused by blowing, reduce a user's feeling of fatigue during operation, and improve the operating comfort; moreover, the airflow outputted from various angles can improve the blowing effect and enable some thin sheet-like objects, such as leaves, to be blown easily.

DETAILED DESCRIPTION

Figure 1:
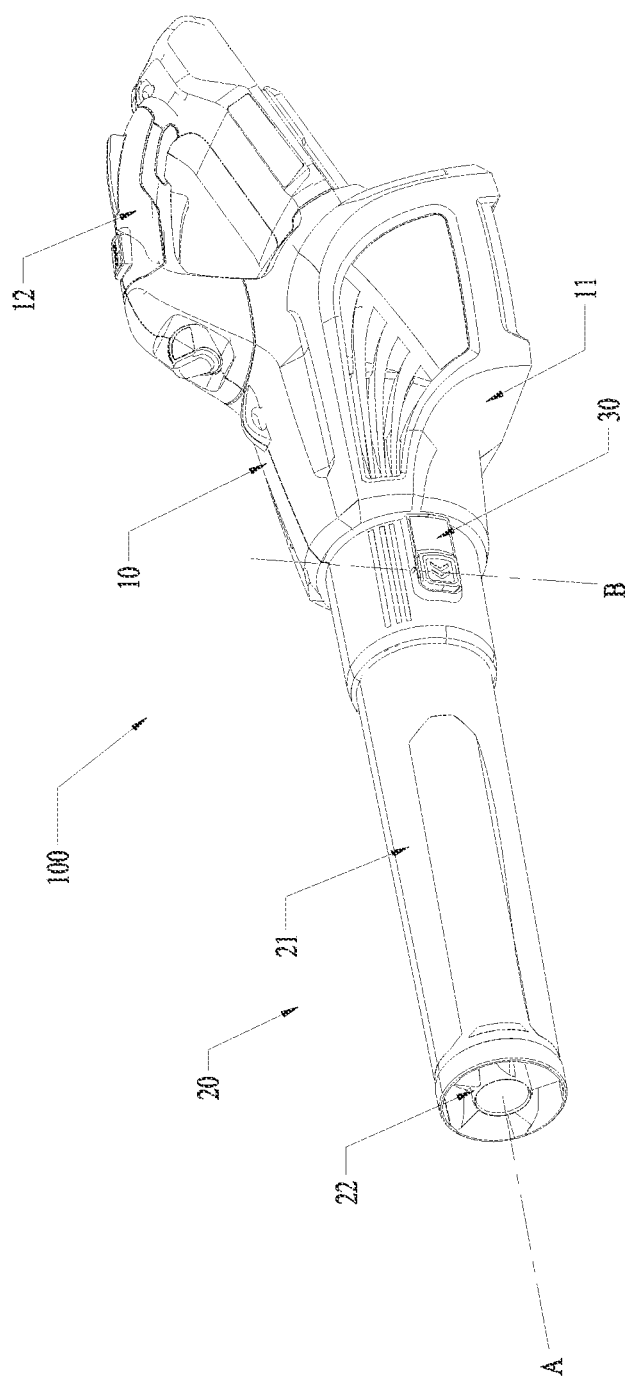
FIG. 1 is a schematic view of an exemplary embodiment of a blower constructed according to the present disclosure.

As shown in FIG. 1, an exemplary and preferred blower 100 comprises a main machine 10, an airflow guiding assembly 20 and a locking button 30.

The main machine 10 comprises a housing 11, a motor 12 and a fan 13.

Referring to FIGS. 1-13, the housing 11 comprises a main machine air channel 111 at least formed in the interior of the main machine 10 and in communication with the environment. The motor 12 and the fan 13 are at least accommodated in the main machine air channel, and the motor 12 drives the fan 13 to rotate around a first axis A.

More specifically, the main machine air channel 111 is an open chamber formed in the main machine 10 by the housing 11, and at least comprises an air channel port 111a. The motor 12 and the fan 13 are assembled together as a whole and then installed in the end or interior of the open chamber. When the fan 13 is rotated, the airflow will be changed in the open chamber.

As a preferred solution, the main machine 10 further comprises an air deflector 14 arranged on the two sides of the fan 13 for adjusting the airflow.

The airflow guiding assembly 20 comprises an air duct 21 and an airflow guiding member 22 which may be two members assembled together or one integral member formed as a single piece. It should be noted that the airflow guiding member 22 may be quickly removed depending on the user's requirements.

One end of the air duct 21 is mated with the air channel port 111a, and the air duct 21 at least can guide the airflow in a direction parallel to the first axis A. Specifically speaking, the air duct 21 is provided with an air duct channel 211 extending at least along the direction of the first axis A.

The airflow guiding member 22 can guide part of the airflow in the air duct 21 to flow in other directions deflecting from the first axis A. Specifically speaking, the airflow guiding member 22 is arranged in the air duct 21 and at least guides the airflow at one end of the air duct 21 away from the fan 13.

As such, the airflow guiding member 22 at least enables the air duct channel 211 to comprise a first airflow guiding section 212 for generating a composite airflow. The first airflow guiding section 212 comprises an annular air-out area 212a at the periphery thereof and a central air-out area 212b at the center of the annular air-out area 212a.

It should be noted that the composite airflow in the present disclosure refers to an airflow containing airflows with more than two flowing directions.

The annular air-out area 212a and the central air-out area 212b respectively output two different airflows. The airflow outputted by the annular air-out area 212a is guided by the airflow guiding member 22 to deflect from its original flowing direction. If the airflow guiding member 22 is arranged appropriately, a cyclone like tornado will be formed in the annular air-out area 212a. The central air-out area 212b enables the central airflow to be outputted with its original flowing direction.

A section of the air duct channel 211 between the fan 13 and the airflow guiding member 22 is a second airflow guiding section 213. The second airflow guiding section 213 only has an upstream airflow guiding chamber 213a. The airflow in the center of the upstream airflow guiding chamber 213a is guided to the central air-out area 212b, and the airflow at the periphery thereof is guided to the annular air-out area 212a.

As a specific technical solution, the air duct 21 is a sleeve structure having a revolving inner wall. In order to obtain a relatively high air speed, the revolving inner wall may be shrunk gradually.

If the airflow is only influenced by the inner wall of the air duct 21, the airflow will flow in a straight line. Thus, a section from the fan 13 to the airflow guiding member 22 in the air duct 21 is the second airflow guiding section 213, and a space surrounded by the inner wall is the upstream airflow guiding chamber 213a.

As a preferred solution, in order to obtain the composite airflow at the airflow guiding member 22, the airflow guiding member 22 comprises more than two airflow guiding wings 221 and an airflow guiding pipe 222.

The airflow guiding wings 221 can deflect and/or turn the airflow passing there through. The airflow guiding pipe 222 guides the airflow therein to continue flowing in the direction parallel to the first axis A. The airflow guiding pipe 222 at least comprises a revolving inner pipe wall 222a. The airflow guiding pipe 222 serves to ensure enough straight air-blowing quantity.

More specifically, the airflow guiding wings 221 have the same shape and are uniformly arranged in the circumferential direction of the airflow guiding pipe 222. The airflow guiding pipe 222 has a first longitudinal length along the first axis A and the airflow guiding wings have a second longitudinal length along the first axis A that is not greater than the first longitudinal length of the airflow guiding pipe 222.

One end of each airflow guiding wing 221 adjacent to the fan 13 is a source end (a) and the other end away from the fan is a terminal end (b). The airflow guiding wing 221 comprises a windward surface 221a and a leeward surface 221b.

The windward surface 221a can prevent the airflow entering from the source end a continuing flowing in the direction parallel to the first axis A and force the airflow entering from the source end (a) to flow out of the terminal end (b) in the direction deflecting from the direction of the first axis A.

Actually, in order to obtain a deflecting guide, it only needs the airflow guiding wings 221 to form the windward surface 221a.

The leeward surface 221b can prevent the airflow entering from the terminal end (b) continuing flowing in the direction parallel to the first axis A and force the airflow entering from the terminal end (b) to flow out of the source end (a) in the direction deflecting from the direction of the first axis A.

The leeward surface 221b serves to cooperate with the windward surface 221a of the adjacent airflow guiding wing 221 to form a channel enabling the airflow to have a certain turning direction, thus a plurality of channels distributed in the circumferential direction are combined together to obtain a cyclone at the periphery of the airflow guiding member.

As a preferred solution, the airflow guiding wings 221 and the airflow guiding pipe 222 are formed as a single piece, and the airflow guiding member 22 is installed in the interior of the air duct 21 by the airflow guiding wings 221.

As a preferred solution, the airflow guiding wing 221 forms a stopping surface 221c at the source end (a); the airflow guiding wing 221 has a wedge-shaped end 221d formed by the intersection of the windward surface 221a and the leeward surface 221b at the terminal end; and the stopping surface 221d comprises two straight lines parallel to each other and perpendicular to the first axis A.

Figure 7:
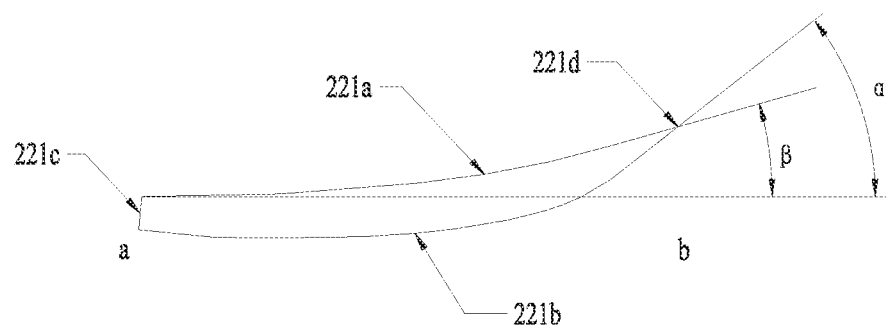
FIG. 7 is a structural schematic view of a section of an airflow guiding wing of the airflow guiding member in FIG. 4 (taken in a section perpendicular to a generating line of a windward surface).
Figure 8:
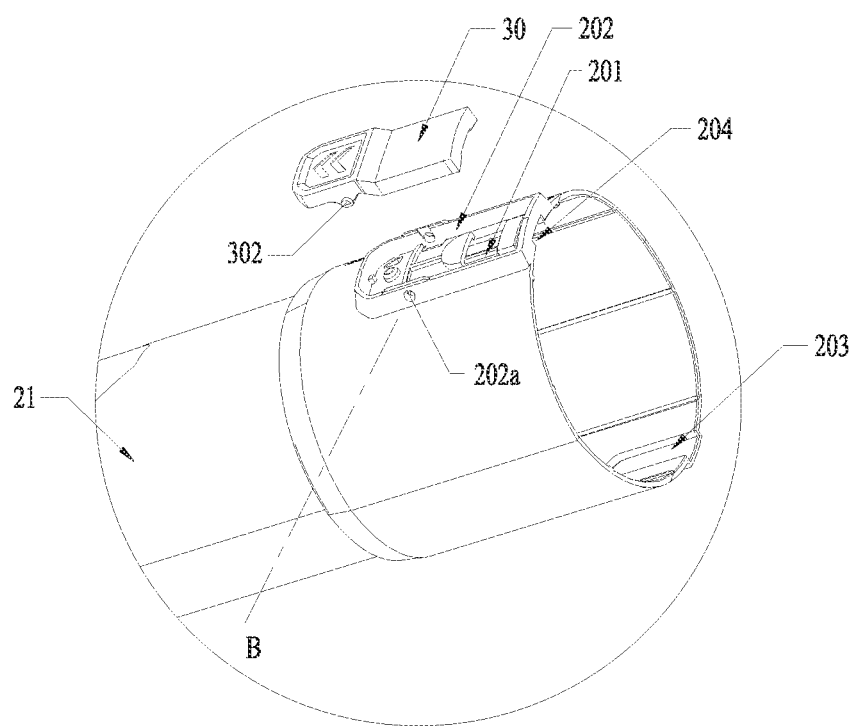
FIG. 8 is an exploded schematic view of a portion of the air duct of the blower of FIG. 1.
Figure 9:
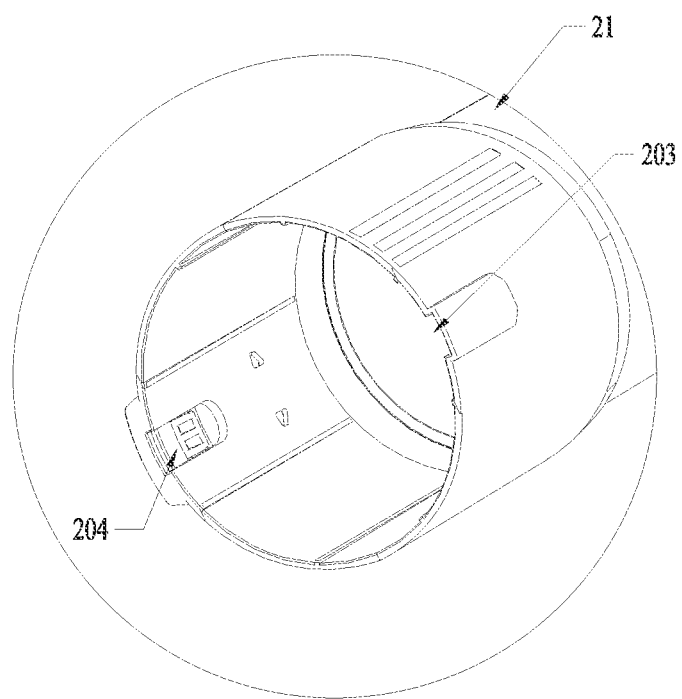
FIG. 9 is a partial schematic view of interior of the air duct of the blower of FIG. 1.

As shown in FIG. 7, the windward surface 221a is a curved surface with a generating line formed by one of the two straight lines and a guiding line formed by a plane curve, and the straight line is perpendicular to a plane of the plane curve. Also, the leeward surface 221b is a curved surface with a generating line formed by the other straight line and a guiding line formed by a plane curve, and the straight line is perpendicular to a plane of the plane curve.

As shown in FIG. 7, in order to obtain a better deflecting guide, a maximum angle α between the windward surface 221a and the first axis A is between 30 and 45 degrees, preferably, 36.5 degrees, and a maximum angle β between the leeward surface 221b and the first axis A is between 15 and 20 degrees, preferably, 17 degrees.

The angle between the windward surface 221a and the first axis A refers to an angle formed by the guiding line of the curved surface of the windward surface 221a and a straight line parallel to the direction of the first axis A, and the angle between the leeward surface 221b and the first axis A refers to an angle formed by the guiding line of the curved surface of the leeward surface 221b and a straight line parallel to the direction of the first axis A.

The windward surface 221a and the leeward surface 221b are smooth curved surfaces and the guiding lines thereof are smooth curves.

The maximum angles between the windward surface 221a, the leeward surface 221b and the first axis A are formed at the wedge-shaped end 221d.

Certainly, the airflow guiding wing 221 may also be given in other forms, as long as it has an airflow guiding surface intersecting with the first axis A. The airflow guiding surface may be formed by a curved surface, a planar surface or their combination.

As a preferred solution, a ratio of the sectional area of the center air-out area 212b to that of the annular air-out area 212a in the section perpendicular to the first axis A is 1:4~7.

A comparison experiment—the results of which are shown in Table 1 below—was performed with the same fan 13 and air duct 21.

In Model 1, the solution does not provide the airflow guiding member 22; in Models 2 to 5, the solutions provide the airflow guiding member 22, and these solutions are identical in size except for the ratio of the sectional area of the center air-out area 212b to that of the annular air-out area 212a in the section perpendicular to the first axis A.

The ratio of the sectional area of the center air-out area 212b to that of the annular air-out area 212a in the section perpendicular to the first axis A may be 1:4, 1:5, 1:6, 1:7, respectively.

The rotation speed of the fan 13 is 22200 rpm, and the experiment results are as follows:

TABLE 1

| Model | Flow Rate (kg/s) | Air Speed |
|---|---|---|
| Model 1 | 0.2919 | 41 |
| Model 2 | 0.2798 | 53.4 |
| Model 3 | 0.2828 | 57.1 |
| Model 4 | 0.2919 | 56.5 |
| Model 5 | 0.2848 | 55.4 |

As shown in Table 1, the addition of the airflow guiding member 22 can significantly increase the air speed and reduce the flow rate. Further, the reduction of the flow rate can reduce the feeling of fatigue due to the reaction force when the user operates the blower and the increased air speed enables the blower to work better.

As a preferably, a ratio of the size of the airflow guiding member 22 along the first axis A to the diameter of the fan 13 is 1:2~4.

Figure 2:
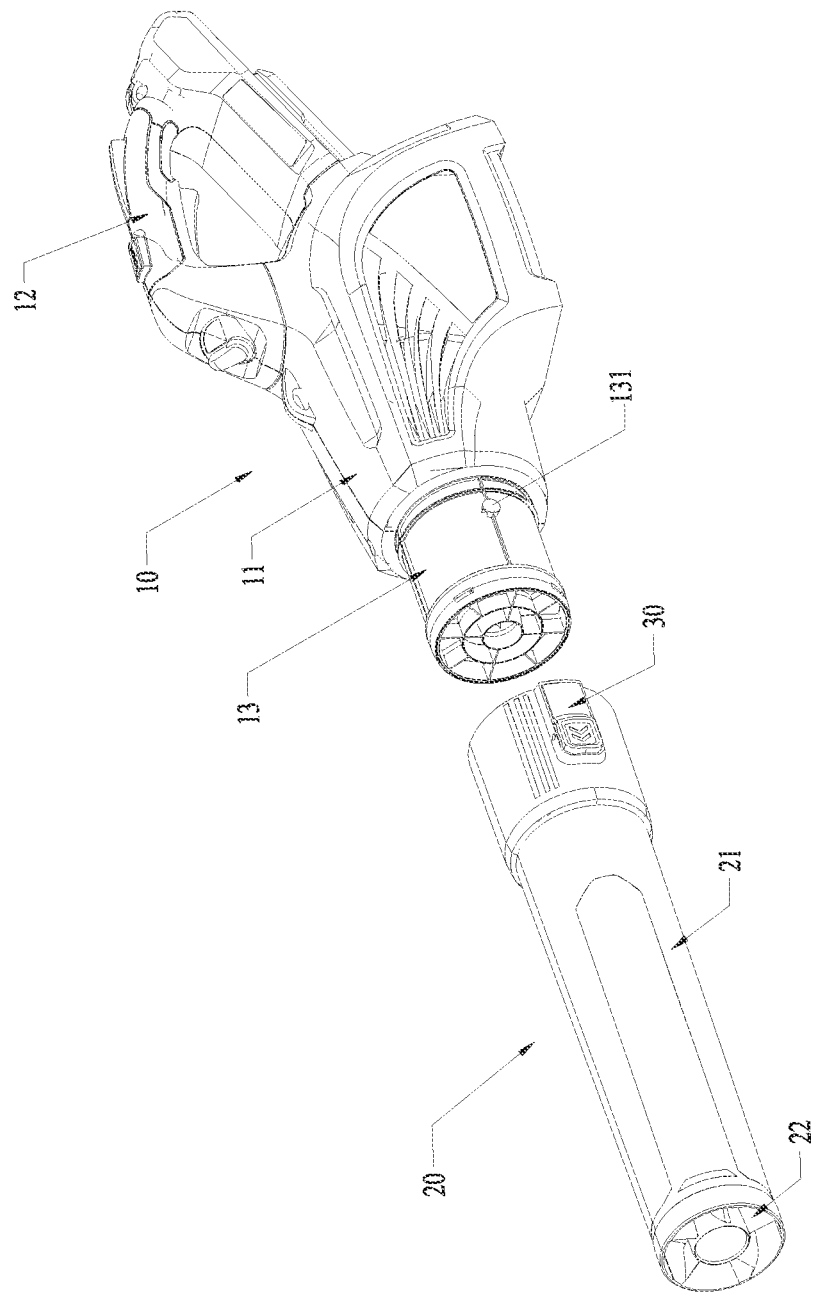
FIG. 2 is an exploded schematic view of the blower of FIG. 1.
Figure 3:
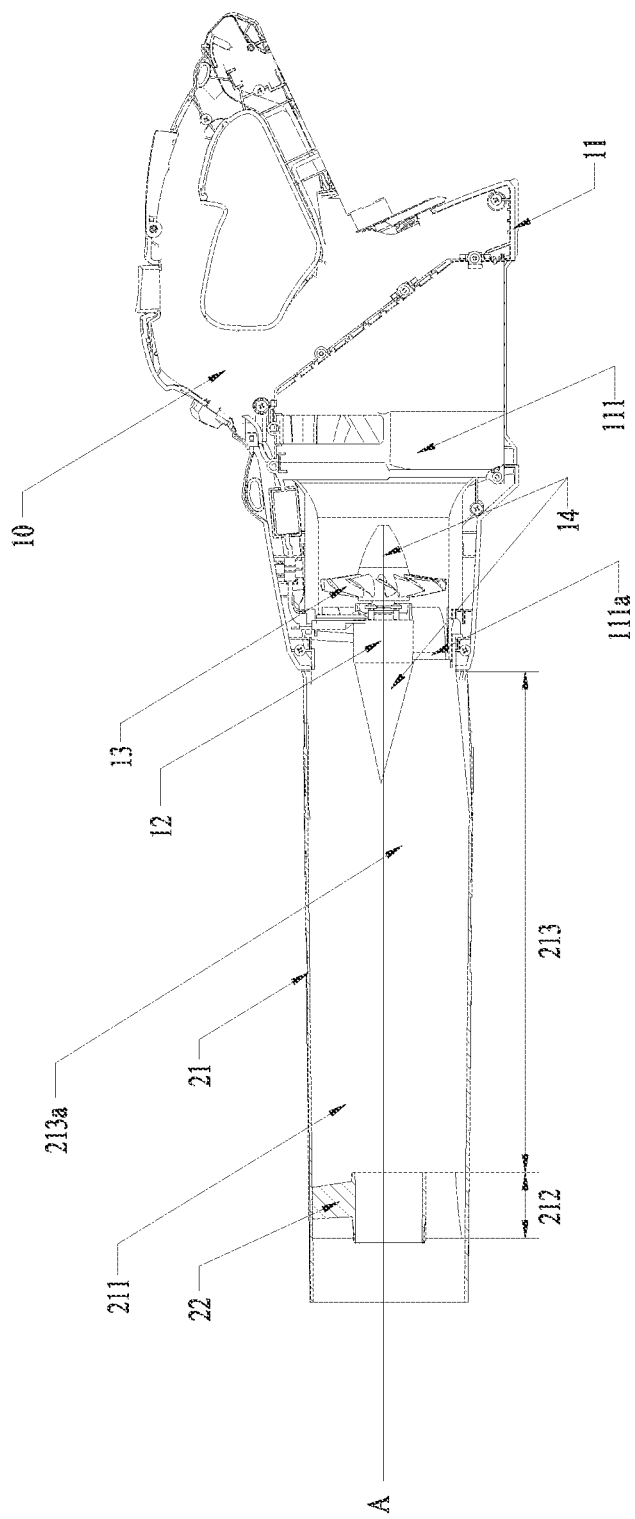
FIG. 3 is a schematic view illustrating the interior structure of the blower of FIG. 1.
Figure 4:
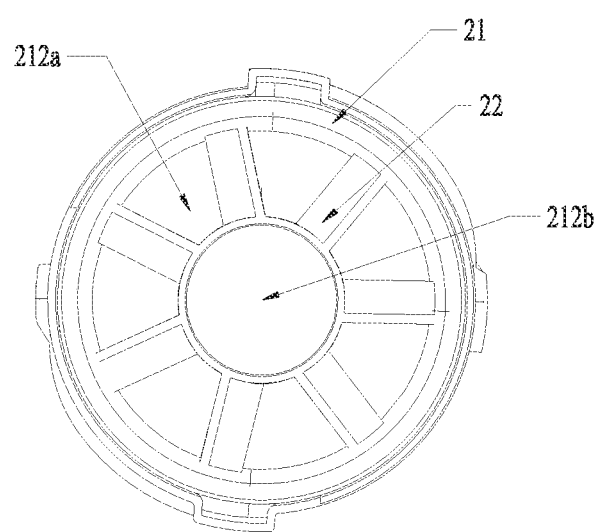
FIG. 4 is a structural schematic view of an end of an air duct of the blower of FIG. 1.
Figure 5:
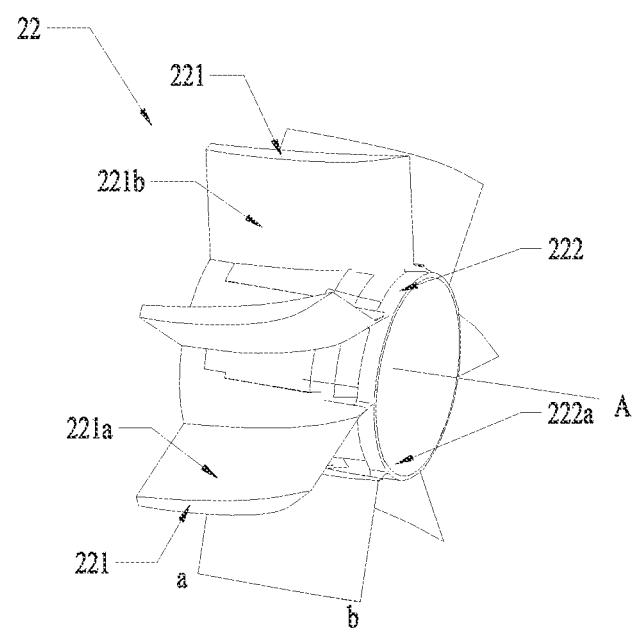
FIG. 5 is a structural schematic view of an exemplary airflow guiding member of the blower of FIG. 1.

As shown in FIGS. 1-2, the locking button 30 and the air duct 21 form a pivoting connection around a pivoting axis B perpendicular to the first axis A.

As shown in FIGS. 1-13, in order to obtain a quick disassembly between the air duct 21 and the main machine 10, the housing 11 comprises a mounting portion capable of mounting the air duct 21 to the main machine at least along the direction of the first axis A. The mounting portion comprises at least one locking buckle 131 for cooperating with the locking button 30.

Figure 6:
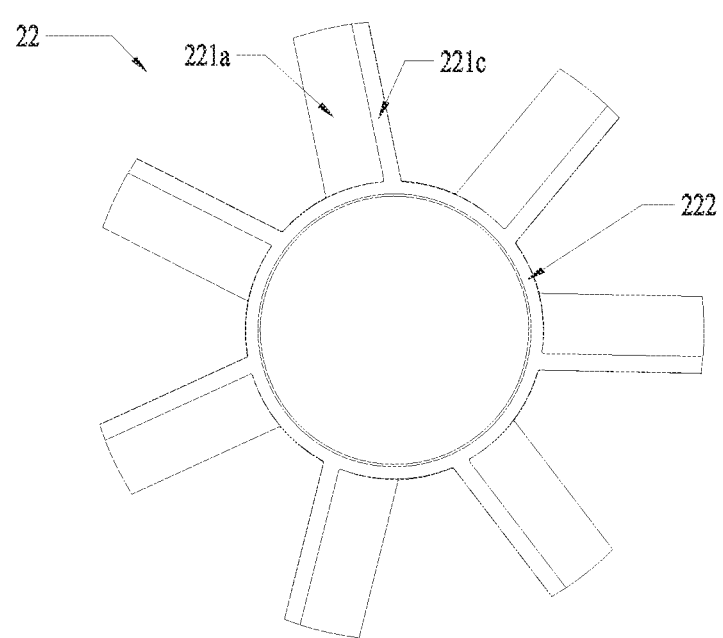
FIG. 6 is a structural schematic view of the airflow guiding member in FIG. 4 as viewed in the direction parallel to the first axis.

Accordingly, the locking button 30 comprises one locking hook 301 for contacting and cooperating with the locking buckle 131 when the locking button 30 is rotated to a first position (i.e. a position as shown in FIGS. 6 and 7).

Figure 10:
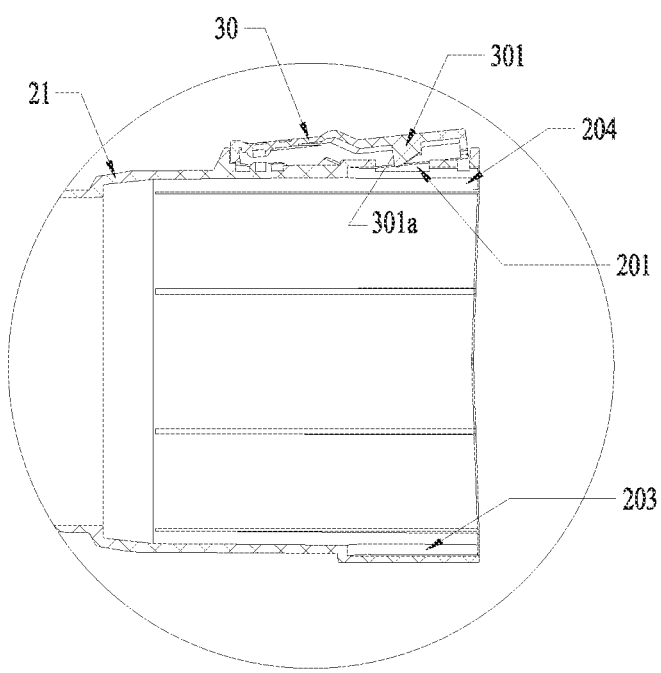
FIG. 10 is a partial sectional schematic view of the blower of FIG. 1 when an exemplary locking button is in an unlocked state.
Figure 11:
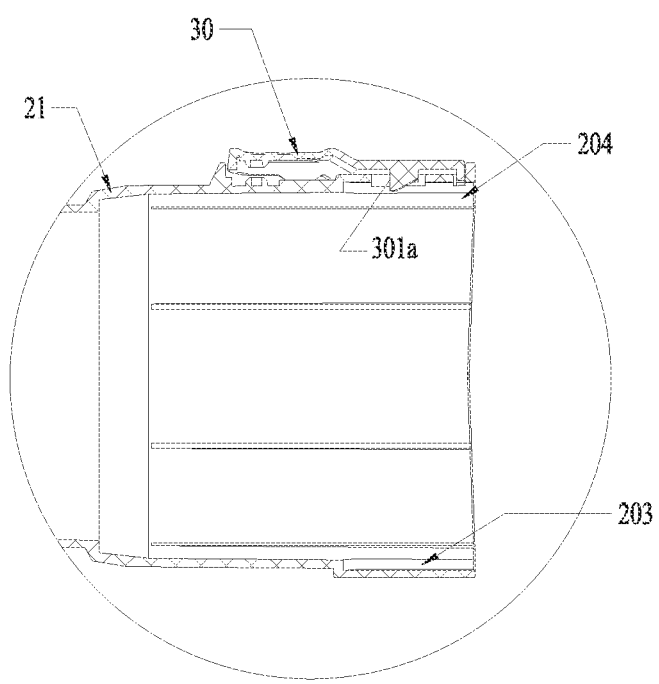
FIG. 11 is a partial sectional schematic view of the blower of FIG. 1 when the locking button is in a locked state.
Figure 12:
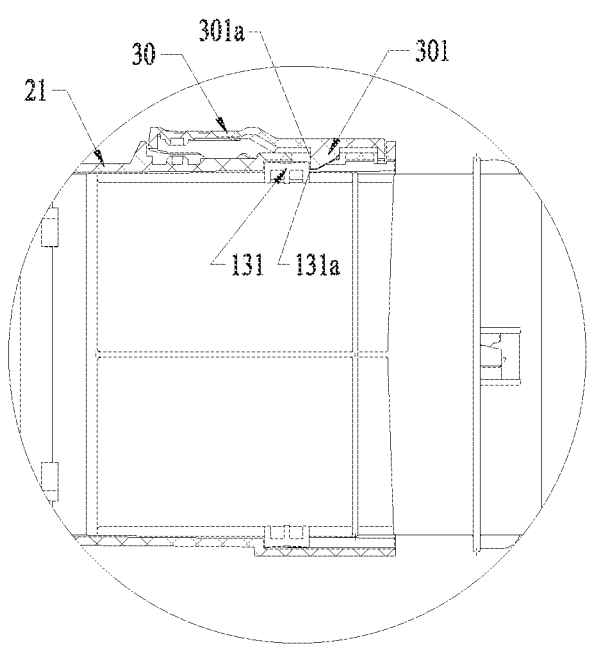
FIG. 12 is a partial schematic view of the blower of FIG. 1 when the air duct is assembled with a mounting portion.
Figure 13:
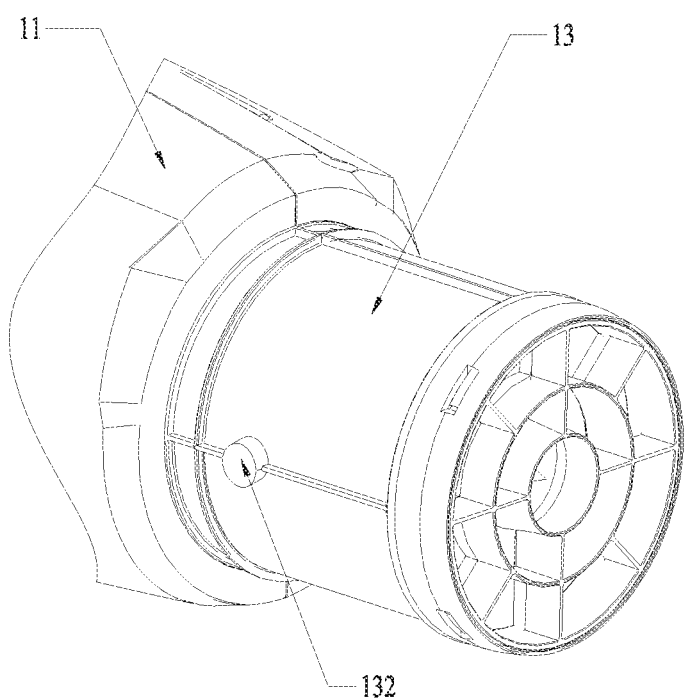
FIG. 13 is a partial schematic view of an exemplary main machine of the blower of FIG. 1

When the locking button 30 is rotated to the position as shown in FIG. 10, the locking hook 301 is disengaged from the locked position and cannot stop the locking buckle 131 anymore, thus the user can quickly remove the air duct 21. Upon the assembly, the user only needs to operate the locking button 30 to rotate to the position as shown in FIG. 10, i.e., the given position where the air duct 21 can be inserted to the mounting portion without hindrance, and then the locking button 30 is rotated to the position as shown in FIG. 11 so that the locking hook 301 cooperates with the locking buckle 131 for locking, thereby accomplishing the quick assembly.

The locking hook 301 is provided with a first contact surface 301a and the locking buckle is provided with a second contact surface 131a for contacting with the first contact surface 301a when the locking hook 301 cooperates with the locking buckle. It should be noted that the first contact surface 301a and the second contact surface 131a may be a planar surface or a curved surface.

In order to enable the locking hook 301 and the locking buckle 131 to cooperate with each other, the air duct 21 is at least provided with a through hole 201 which enables the locking hook 301 to cooperate with the locking buckle 131 in the air duct 21 when the locking button 30 is rotated to the first position.

Preferably, the mounting position is arranged in the air duct 21. The mounting portion is a projecting portion formed by the housing 11 and designed as a wind guiding pipe 13 for the fan to output the airflow. When the wind guiding pipe is mated with the air duct 21, the air duct 21 is sleeved on the periphery of the wind guiding pipe, thereby obtaining the mating of the air channel.

As a preferred solution, the locking button 30 is arranged on the end of the air duct 21 adjacent to the main machine 10, thereby reducing the length of the mounting portion along the first axis A.

As a preferred solution, a biasing member (not shown) for biasing the locking button 30 is arranged between the locking button 30 and the air duct 21 and the locking button 30 trends to rotate to the first position under the biasing. As such, the locking button 30 can be restored to the first position automatically, and the locking hook 301 is always in contact with the locking buckle 131, hereby maintaining the air duct 21 to be locked on the mounting portion.

Specifically speaking, the biasing member is a spiral spring with two ends bearing against the air duct 21 and the locking button 30 respectively, or a torsion spring arranged at the pivoting shaft of the locking button 30.

As a preferred solution, in order to prevent the locking button 30 from projecting too much, the air duct 21 is provided with a mounting groove 202 for mounting the locking button 30 in the interior thereof. The locking button 30 comprises a pivoting portion 302, and the mounting groove 202 is provided with a pivoting hole 202a for accommodating the pivoting portion 302. The pivoting hole 202a may be a through hole or a blind hole. As such, the locking button 30 generally rotates in a space provided by the mounting groove 202 so that the locking button 30 is protected and the pivoting portion 302 can be appropriately supported.

As a preferred solution, in order to enable the air duct 21 and the mounting portion to align with the corresponding positions during the insertion, the mounting portion is provided with at least one guiding projection 132 at the periphery thereof and the air duct 21 is provided with at least one guiding groove 203 for cooperating with the guiding projection 132 in the interior thereof.

As a preferred solution, in order to reduce the travel of rotation of the locking button 30, the locking buckle 131 projects from the mounting portion. Moreover, in order to prevent the projecting locking buckle 131 from hindering the insertion of the air duct 21 and the mounting portion, the air duct 21 is provided with an accommodating groove 204 in which the locking buckle 131 is embedded.

As described above, the air duct 21 can accomplish the quick assembly and disassembly on the main machine 10 by the locking button 30, thereby providing a basis for using various replaceable air ducts 21 to extend the functions of the blower 100.

What is claimed is:

1. A blower, comprising:
   a main machine having a main machine air channel; and
   an airflow guiding assembly for guiding an airflow generated in the main machine air channel;
   wherein the main machine comprises:
      a housing forming a portion of the main machine air channel;
      a fan for generating the airflow in the main machine air channel; and
      a motor for driving the fan to rotate;
      wherein the fan and the motor are accommodated in the housing;
   wherein the airflow guiding assembly comprises:
      an air duct for guiding the airflow in the main machine air channel to flow in a direction parallel to a first axis; and
      a unitary airflow guiding member separate from the air duct and removably mountable within the air duct for guiding a part of the airflow in the air duct to flow in a direction deflecting from parallel to the first axis;
      wherein the air duct has two opposite ends, one of which is coupleable with the housing of the main machine, and the airflow guiding member is removably mountable proximate to the other end,
      wherein the airflow guiding member is removably accommodated in the air duct;
      the airflow guiding member comprising:
      a substantially cylindrical airflow guiding pipe having a substantially constant diameter along the entire length of the airflow guiding pipe and arranged coaxial with the first axis and arranged to guide a first portion of the airflow to flow in a direction parallel to the first axis; and
      more than two airflow guiding wings arranged to deflect a second portion of the airflow passing there through,
   wherein the airflow guiding wings all have the same shape as one another and are arranged at a periphery of the airflow guiding pipe so as to generate a cyclone around the periphery of the airflow guiding pipe,
   wherein the airflow guiding wings and the airflow guiding pipe are formed as a single piece and the airflow guiding wings are positioned between an inner wall of the air duct and an outer wall of the airflow guiding pipe,
   wherein the cylindrical airflow guiding pipe has a first longitudinal length along the first axis and the airflow guiding wings have a second longitudinal length along the first axis that is not greater than the first longitudinal length of the cylindrical airflow guiding pipe,
   wherein one end of each airflow guiding wing proximate the fan is defined as a source end, and the other end away from the fan is defined as a terminal end, and
   wherein the airflow guiding wings extend along a curve deflecting from a direction parallel to the first axis.

2. The blower according to claim 1, wherein the airflow guiding wing comprises a windward surface arranged to prevent the airflow entering from the source end from continuing to flow in the direction parallel to the first axis and to force the airflow entering from the source end to flow out of the terminal end in the direction deflecting from the direction of the first axis.

3. The blower according to claim 1, wherein the airflow guiding wing is formed with a leading surface at the source end and a wedge-shaped end formed by the intersection of the windward surface and the leeward surface at the terminal end.

4. The blower according to claim 3, wherein the stopping surface comprises two straight lines parallel to each other and perpendicular to the first axis, and the windward surface is a curved surface with a generating line formed by one of the two straight lines and a guiding line formed by a plane curve, the straight line being perpendicular to a plane of the plane curve.

5. The blower according to claim 4, wherein the leeward surface is a curved surface with a generating line formed by the other straight line and a guiding line formed by a plane curve, the straight line being perpendicular to a plane of the plane curve.

6. The blower according to claim 1, wherein the airflow guiding assembly further comprises a locking button arranged to form a pivoting connection with the air duct around a pivoting shaft perpendicular to the first axis, the housing further comprises a mounting portion arranged to mount the air duct to the main machine at least along the direction of the first axis, the locking button is formed with a locking hook, and the mounting portion is provided with a locking buckle for cooperating with the locking hook and wherein the air duct is at least provided with a through hole through which the locking hook passes.

7. The blower according to claim 6, wherein the mounting portion of the housing is arranged in the interior of the air duct and the locking button is arranged on one end of the air duct adjacent to the main machine.

8. The blower according to claim 6, wherein a biasing member for biasing the locking button is arranged between the locking button and the air duct and the locking button tends to rotate to a first position under the biasing.

9. The blower according to claim 6, wherein the locking buckle protrudes from the mounting portion and the air duct is provided with an accommodating groove in which the locking buckle is embedded.

10. The blower according to claim 6, wherein the air duct is provided with a mounting groove for mounting the locking button, the locking button has a pivoting portion, and the mounting groove is provided with a pivoting hole for accommodating the pivoting portion.

11. The blower according to claim 1, wherein a ratio of the sectional area of the cylindrical airflow guiding pipe to that of the area between the outer wall of the airflow guiding pipe and the inner wall of the air duct is approximately between 1:4 and 1:7.

* * * * *